United States Patent

Zippel et al.

[15] 3,690,441
[45] Sept. 12, 1972

[54] CONVEYOR ARRANGEMENTS

[72] Inventors: Bernd Zippel, Langenhain; Alfred Schlieckmann, Eschwege, both of Germany

[73] Assignee: Richard Zippel & Co. KG, Eschwege, Germany

[22] Filed: Feb. 20, 1970

[21] Appl. No.: 12,918

[30] Foreign Application Priority Data

March 1, 1969 Germany..........P 19 10 537.4

[52] U.S. Cl. ........................198/131, 74/243, 74/250
[51] Int. Cl............................................B65g 17/00
[58] Field of Search......198/131, 177; 74/240, 250 R

[56] References Cited

FOREIGN PATENTS OR APPLICATIONS

| 686,455 | 12/1939 | Germany....................198/177 |
| 1,295,551 | 5/1961 | France.......................198/131 |

*Primary Examiner*—Richard E. Aegerter
*Assistant Examiner*—Douglas D. Watts
*Attorney*—Nolte and Nolte

[57] ABSTRACT

An endless conveyor arrangement for carrying moulds in a plant for producing shaped parts from multi-component plastics mould filling material, is disclosed. The arrangement comprises a chain having a plurality of first link members each arranged to carry a mould and a plurality of second link members intermediate the first link members and pivotally attached thereto. Each of the first link members comprises a pair of mutually spaced parallel plate members, between which the respective end portions of adjacent second link members project. The chain passes over two mutually spaced horizontal co-planar guide wheels, and the periphery of each guide wheel is formed by a plurality of forked members which are adapted to span the second link members of the chain. Linear support rails are disposed adjacent runs of the chain intermediate the guide wheels, and these support rails engage rollers or wheels mounted on the chain.

5 Claims, 6 Drawing Figures

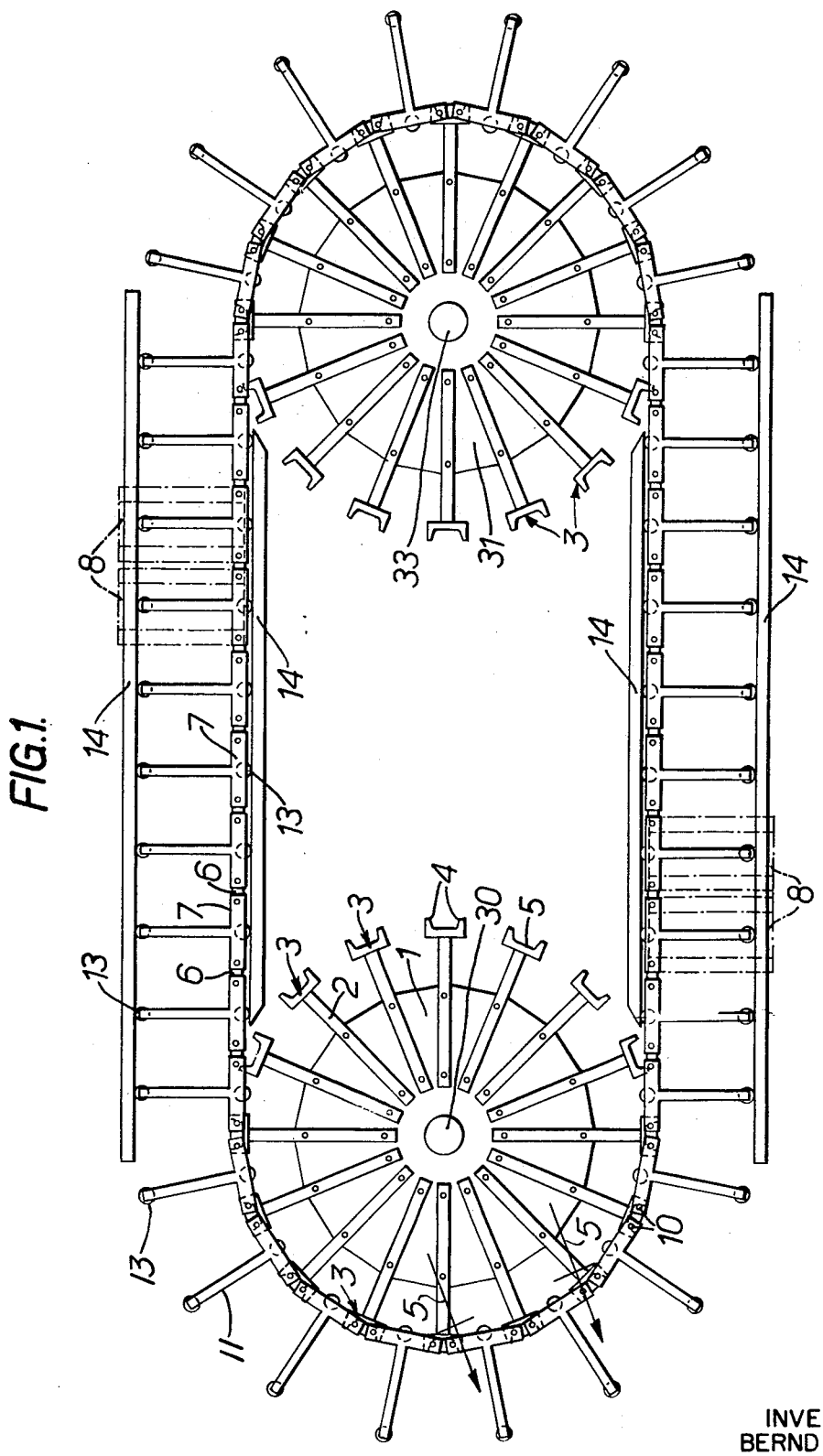

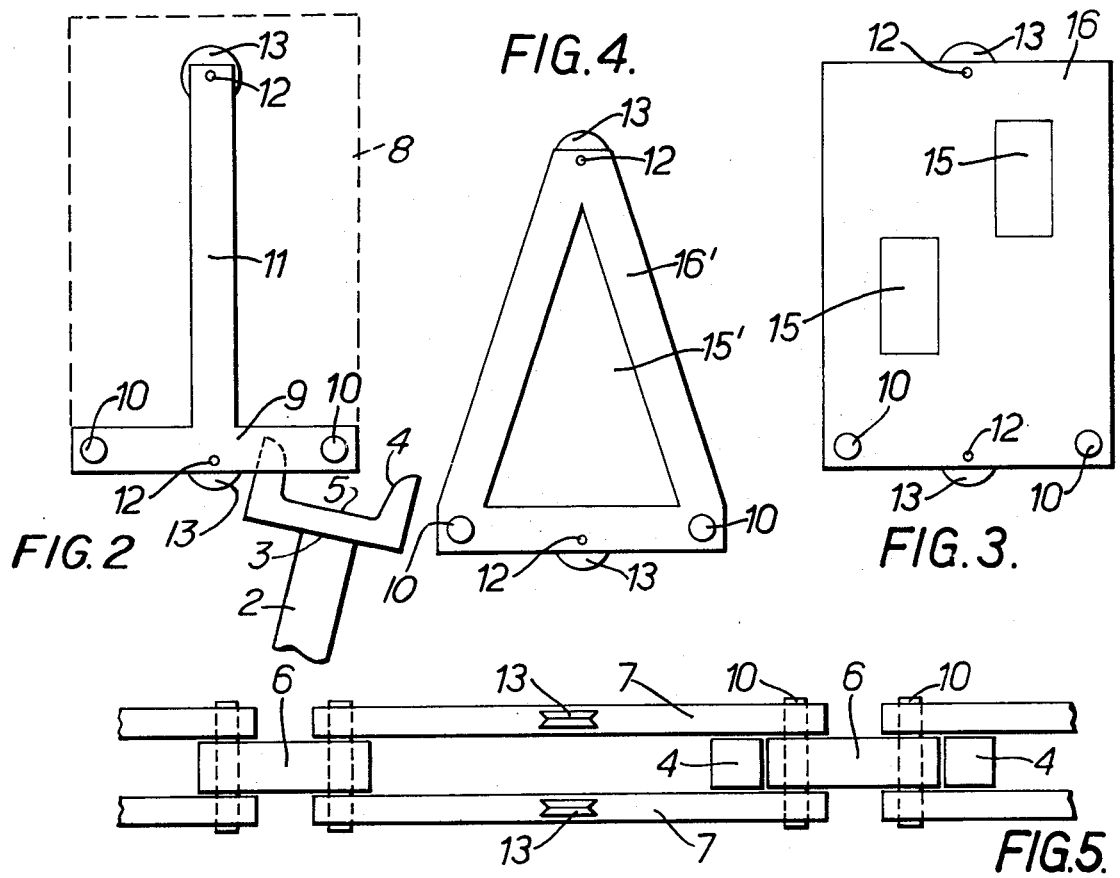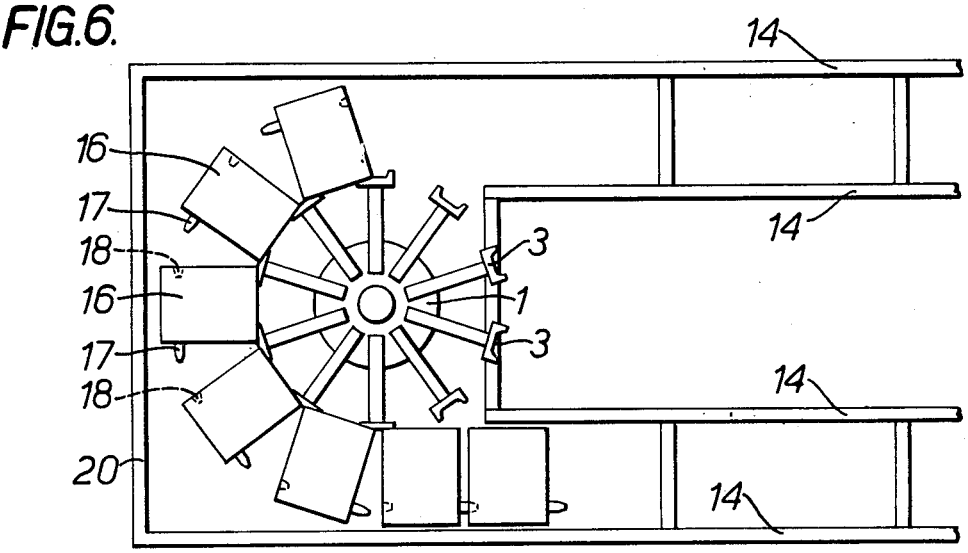

CONVEYOR ARRANGEMENTS

BACKGROUND OF THE INVENTION.

The present invention relates to improvements in endless conveyors, especially to conveyors for carrying moulds in a plant for producing shaped parts from multi-component plastics mould filling material.

Multi-component plastics are generally manufactured from liquid components. These liquid components are mixed in a mixing device and then rapidly become paste-like and after only a short time show a viscous consistency. For these reasons it is essential that the intermittently operating mould-filling mechanisms effect a discharge of the plastic mixture and fill a mould with this mixture with a discharge periodicity of between three to thirty seconds, approximately. If longer periods elapse between two successive discharges of the plastic components mixture, an automatic cleaning device comes into action which flushes and cleans the mixing plant so that the latter does not become stuck up by the plastic mixture as it becomes viscous. Hence conveyors for the casting moulds must be so designed that in each of these short periods of time they must convey a new mould into the mould-filling plant and remove the already filled mould. But since the plastics have to remain in the mould for a fairly long time before they are fully cured, or cured to such an extent that the plastic articles which have been manufactured can be knocked out of the mould, the conveying systems often have a long belt and therefore occupy much space. This is an important disadvantage. For throughout industry the need is for plant which saves space as much as possible.

Conventional endless conveyors running in a horizontal plane are, for example, the so-called plate conveyors. These have plates as the conveying elements. On the underside the plates have wheels which run on rails. An endless, rotating chain is located beneath the middle of the plates and the rails. The plates are connected to this endless, rotating chain. A disadvantage of this system is the fact that the plates have to be at a relatively large distance apart so that, at the ends of the straight conveying stretches, these plates can negotiate a curved track. The relatively large distance is necessary so that on these curves the plates do not jolt one another on the side of the plates which faces the space between the two curved paths. This results in much dead space between the individual plates which is of no use and, in fact, only increases the amount of space required by the system.

A further disadvantage of these conventional plate conveyors is that the space underneath the plates is utilized for housing the wheels supporting the plates, the rails on which the wheels run and the endless rotating chain of the conveyor. Consequently, the actuating means for the ejectors cannot be disposed beneath the plates and therefore the ejectors have to be adapted to operate from the sides of the conveyor. This arrangement increases the amount of space required by the plant.

SUMMARY OF THE INVENTION.

According to the present invention there is provided a horizontally travelling conveyor arrangement for a mould filling plant, comprising a chain having a plurality of first link members each arranged to carry or engage with a mould and each comprising a pair of vertically spaced parallel plate members and a plurality of second link members intermediate the first link members and pivotally attached thereto, end portions of the second link members projecting between the parallel plates of the adjacent first link members. Horizontally spaced guide wheels are provided for guiding the chain, and each has forked members spaced around its circumference, the forked members each being adapted to span a second link member of the chain. A plurality of rollers are rotatably mounted on the chain and linear support rails engage the rollers, intermediate the guide wheels, where pairs of support rails are disposed, while in the regions of the conveyor path round the guide wheels, the plate members are supported in the horizontal plane by the forked members of the guide wheels and so the pairs of rails can be dispensed with in these regions. In this way, not only is a very simple and space saving construction obtained but it also becomes possible, as a result, for the actuating mechanisms for the ejectors disposed on the individual plates to be operated from below the moulds. This not only saves space, because now, of course, these ejector mechanisms can be disposed in the unused space beneath the plate members, but is also productive of a simpler ejector mechanism construction which is less susceptible to breakdown.

The forked members on the guide wheels are approximately as wide as the second link members of the chain and their prongs are pushed between the side plates of the chain during the guiding of the chain over the guide wheels. In this way, it is made possible to dispense with the rails in the region of the reversing stretches of the conveyor path without the plates coming out of their plane through forces of gravity.

The wheels running in the rails are preferably mounted in the middle of the sides parallel to the chain, of the plate members. It is simplest to mount them there. It is also convenient if the wheels running in the rails are disposed in perpendicular projection to the middle of the side plate members on the side of the conveying means facing away from the chain.

It is advantageous if the side plate members are constructed as the conveying means on which the moulds are fastened directly. This permits a substantial economy of material and provides a greater robustness of the whole conveying system. With this arrangement it is possible for the side plate members to be T-shaped plates, the transverse arms of which are articulated with the second link members of the chain and the longitudinal arms have bearings at both ends for the wheels running on the rails. In another preferred construction the side plate members are rectangular plates, on one side of which are provided pivot bearing pins for connecting the plate members to the second link members of the chain. Alternatively, the side plate members are triangular in shape with the pins for connecting the plate members to the second link members of the chain provided on one side of the respective plate members.

It is convenient if the rectangular or triangular side plate members have openings for the passage of ejectors.

To increase the stability of a plate conveyor it may be convenient if the plates on the part remote from the chain carry interlocking devices. These locking devices are then conveniently released automatically as the chain conveyor passes round the guide wheels and automatically re-engage after the conveyor has passed over the guide wheels.

BRIEF DESCRIPTION OF THE DRAWINGS.

Embodiments of the present invention will now be more particularly described with reference to the accompanying drawings, in which:

FIG. 1 shows a plan view of a conveyor arrangement embodying the invention;

FIG. 2 similarly shows a T-shaped plate member associated with other parts of the conveyor arrangement;

FIG. 3 similarly shows a rectangular shaped plate member forming a part of a conveyor arrangement;

FIG. 4 shows a triangular plate member forming a part of a conveyor arrangement;

FIG. 5 shows a side view of the conveyor arrangement as seen along lines 5—5 in FIG. 1; and FIG. 6 shows a partial plan view of a modified plate conveyor arrangement.

DESCRIPTION OF THE PREFERRED EMBODIMENTS.

Referring now to the drawings, a conveyor arrangement comprises two horizontally spaced co-planar guide wheels 1 and 31 which are shown in FIG. 1. The guide wheels 1 and 31 are mounted on shafts 30 and 33, respectively. The shaft 30 is a driven shaft and constitutes drive means for the conveyor. Each of the guide wheels 1 and 31 have radial arms 2 on which forked members 3 are disposed. Each of the forked members 3 is so shaped that, between two prongs 4 located as indicated in FIG. 1, an intermediate portion 5 is provided. The length of the intermediate portion 5 is matched to the length of second link members 6 of the chain conveyor. The prongs or tines 4 and the intermediate portion 5 of each of the forked members 3 embrace approximately half of the periphery of each of the second chain link members 6. As the respective forked members 3 engage the chain conveyor comprising parallel and mutually spaced plate links 7 and second link members 6, the prongs 4 are pushed between the vertically spaced plate links 7 (FIG. 5) and thus contact their inner surfaces and support them in a horizontal plane. Each plate member 7 carries a mould, as shown by broken lines and indicated by the reference 8 in FIG. 1. Wheels or rollers 13 are rotatably mounted on the sides of plate members 7, spaced transversely of the chain, and these rollers 13 engage grooves in rails 14. The rails 14 are disposed adjacent portions of the chain conveyor which extend intermediate the guide wheels.

It is convenient if the plate members 7 are constructed directly as conveying means, as shown in FIGS. 2, 3 and 4. The casting moulds 8 are then fixed on to these plate members by screws for example.

As shown in FIG. 2, the plate link members are shaped as a "T", for example. The transverse arm 9 of each of the T-shaped plate link members has holes at its ends through which pins 10 pass and to which the second link members 6 are swivel-mounted. The longitudinal arm 11 of each T-shaped plate link has pins 12 at both ends, to which are mounted wheels or rollers 13 which run on rails 14. These rollers 13, serve, simultaneously, to support the chain conveyor against forces acting in both horizontal and vertical directions. For this reason, each of the rollers 13 has a groove in its circumference, as schematically shown in FIG. 5, and in which the rail 14 engages.

As shown in FIG. 3, the plate link members are rectangular, and are indicated generally by the reference 16. Each of the rectangular plate link members 16 has openings 15, through which ejector actuators can penetrate. Two holes are provided in each rectangular plate 16 through which pins 10 are inserted for the swivel-mounting of the second link members 6 of the chain conveyor. Each of the plate link members 16 also has holes centred on its longitudinal axis of symmetry in which are inserted pins 12 for supporting rollers 13.

FIG. 4 shows a triangular shaped link plate member 16 having a triangular aperture 15 but in other respects similar to the plate link members which have been described above with reference to FIG. 3. Depending on the ejector arrangement which is used, a choice can be made from the variously shaped plate link members shown in FIGS. 2 to 4. Generally, the T-shaped plate link member of FIG. 2 is preferred, but greater rigidity is obtained when either of the plate link members shown in FIGS. 3 or 4 is utilized.

Since, as shown in FIG. 5, it is convenient for parallel mutually spaced plate link members 7— as is the general practice with chains — to be disposed on either side of the second chain link members 6, it is also possible to combine different shapes of plate link members depending on the requirements of a particular application. For example, to use rectangular plates to provide the upper members of the loop chain conveyor and to provide T-shaped link plates below.

In FIG. 6 there is shown another conveyor arrangement in accordance with an embodiment of the invention. In FIG. 6, the support frame of the conveyor arrangement is indicated by the reference 20. The conveyor arrangement comprises two horizontal co-planar guide wheels, one of which is shown in FIG. 6 and indicated by the reference 1. Each of the guide wheels is provided with radially projecting spokes, the end portions of which are attached to the forked members 3 which form the periphery of each of the guide wheels. As shown in FIG. 6, each of the plate link members 16 is provided with a projecting tongue 17. These tongues serve as locking devices which engage and co-operate with support members 18 as soon as the plates 16 are traversing portions of the conveyor path intermediate the drive wheels.

Such traversing of intermediate conveyor path portions can again proceed by means of equipment as shown in FIG. 1, as has also been pointed out in the Summary of the Invention. Accordingly, the rollers 13 carried by the plates 16 engage between the rails 14. Locking devices 17, 18 of FIG. 6 provide additional stabilization of the rows of plates on the straight stretches of the conveyor path.

We claim:

1. An endless conveyor arrangement for a mould filling plant, comprising in combination: a pair of mutually spaced guide wheels; a chain arranged around said guide wheels and having a plurality of first link members each arranged to carry a mould and each comprising a pair of mutually spaced parallel T-shaped plate members, and having a plurality of second link members intermediate said first link members for pivotal attachment thereto, each of said plate members comprising a transverse member and a longitudinal member, opposite end portions of each said transverse member being pivotally connected to respective ones of said second link members; forked members spaced around the circumference of each said guide wheels, said forked members each being adapted to entrain a respective one of said second link members; a plurality of rollers rotatably mounted on said chain, one of said rollers being rotatably mounted on each opposite end portion of each said longitudinal member; and linear support rails to engage said rollers, said support rails being disposed substantially parallel to a run of said chain intermediate said guide wheels.

2. An arrangement as defined in claim 1, wherein each of said fork members comprises two mutually spaced co-planar prongs separated by an intermediate fork member portion, the length of said intermediate portion being substantially equal to the length of each of said second link members and the width of said prongs being substantially equal to the width of said second link members, said prongs engaging portions of said chain passing over said guide wheels and projecting between said plate members of said pairs.

3. An endless conveyor arrangement particularly for a mould filling plant, comprising in combination:
 a. a chain substantially arranged in a single horizontal plane, said chain comprising first link members each consisting in substance of a pair of vertically spaced parallel plate members, at least one of which extends horizontally from the path of the chain to an area lateral of that path and is adapted in such area to support a mould or the like, standing on the plate member; second link members being provided as parts of the chain, each lying between such parallel plate members and pivotally interconnecting the first link members;
 b. a plurality of horizontally spaced guide wheels, each guiding a section of said chain;
 c. a series of tines spaced around and projecting from the circumference of each guide wheel, the tines extending into the space between said plate members, for contact with end surfaces of the interconnecting second link members, to propel the chain, and also in surface contact with laterally extended horizontal surfaces of said plate members, laterally of the travel of the chain, so that such tines absorb bending forces caused by the weight of the plate members and of moulds or the like standing thereon, which would tend to twist the chain section guided by the guide wheel;
 d. ground support means extending adjacent sections of said chain between said guide wheels; and
 e. roller means carried at laterally opposite extreme portions of each horizontally extending plate member, said roller means being adapted to rollably engage with said ground support means to support sections of said chain extending between said guide wheels and thereby to absorb bending forces caused by the weight of the plates and of moulds or the like standing thereon, which would tend to twist the chain between the guide wheels.

4. An endless conveyor arrangement for a mould filling plant, comprising in combination: a pair of mutually spaced guide wheels; a chain arranged around said guide wheels and having a plurality of first link members each arranged to carry a mould and each comprising a pair of mutually spaced parallel triangular plate members, the chain also including second link members intermediate said first link members for pivotal attachment thereto, each of said triangular plate members comprising three sides, with an aperture therebetween and with opposite end portions of one such side being pivotally connected to respective second link members; forked members spaced around the circumference of each said guide wheels, said forked members each being adapted to entrain a respective one of said second link members; a plurality of rollers rotatably mounted on said chain, one of said rollers being rotatably mounted on each apex portion of a triangular member, opposite said one side; and linear support rails to engage said rollers, said support rails being disposed substantially parallel to a run of said chain intermediate said guide wheels.

5. An endless conveyor arrangement for a mould filling plant, comprising in combination: a pair of mutually spaced guide wheels; a chain arranged around said guide wheels and having a plurality of first link members each arranged to carry a mould and each comprising a pair of mutually spaced parallel rectangular plate members, the chain also including second link members intermediate said first link members for pivotal attachment thereto, each of said rectangular plate members comprising four sides, with opposite end portions of one such side being pivotally connected to respective second link members; forked members spaced around the circumference of each said guide wheels, said forked members each being adapted to entrain a respective one of said second link members; a plurality of rollers rotatably mounted on said chain, one of said rollers being rotatably mounted on each central portion of a side of said rectangular member opposite said one side; and linear support rails to engage said rollers, said support rails being disposed substantially parallel to a run of said chain intermediate said guide wheels.

* * * * *